Dec. 18, 1934.    G. M. DEMING    1,984,868
GAS PRESSURE STABILIZER
Filed Aug. 16, 1932    2 Sheets—Sheet 1

INVENTOR
George M. Deming
By J. Vandenberg
ATTORNEY

Dec. 18, 1934.　　　　G. M. DEMING　　　　1,984,868
GAS PRESSURE STABILIZER
Filed Aug. 16, 1932　　　2 Sheets-Sheet 2
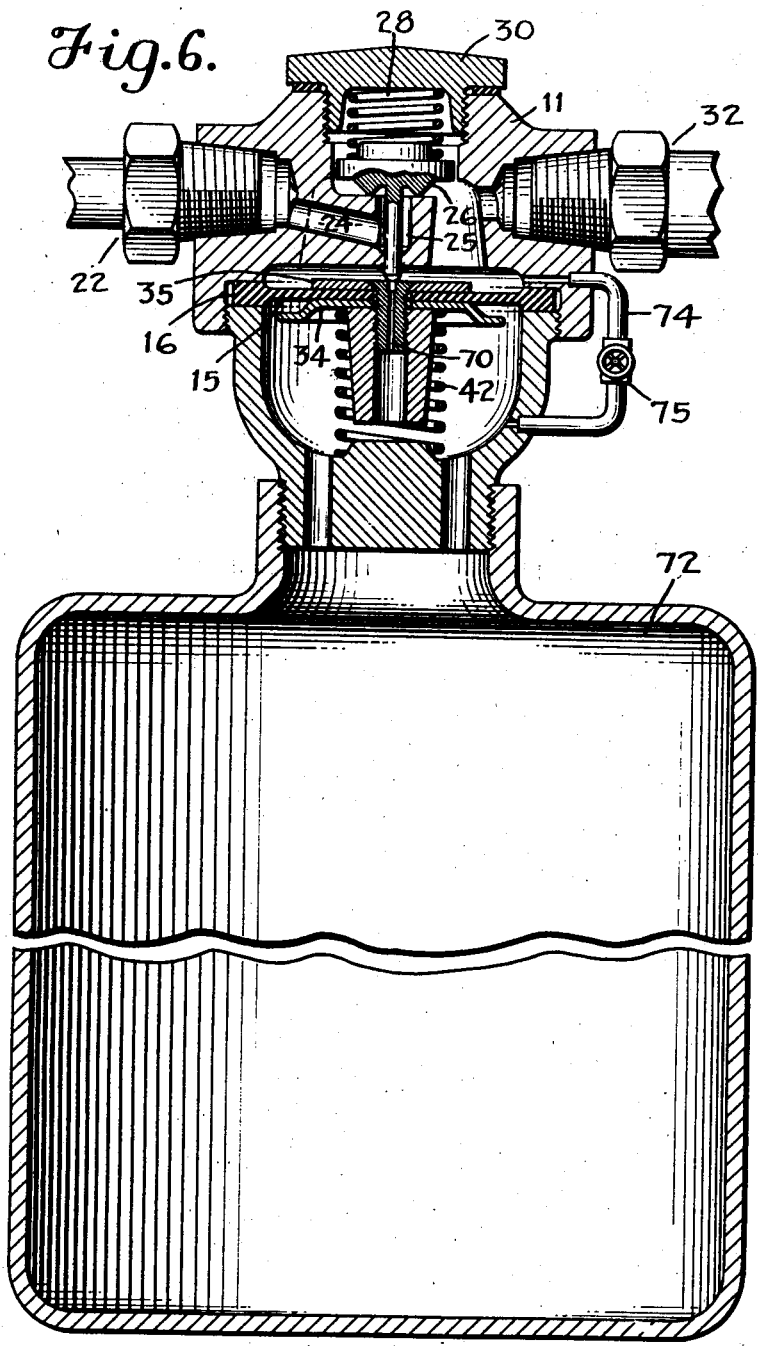

Patented Dec. 18, 1934

1,984,868

UNITED STATES PATENT OFFICE 1,984,868

GAS PRESSURE STABILIZER

George M. Deming, East Orange, N. J., assignor to Air Reduction Company, Incorporated, New York, N. Y., a corporation of New York Application August 16, 1932, Serial No. 629,003

17 Claims. (Cl. 137—71)

This invention relates to apparatus for eliminating fluctuations in the pressure of gas flowing through a delivery line.

The oxygen used for welding is ordinarily supplied from cylinders containing the gas at very high pressure. A pressure regulator, on or near the cylinder, reduces the pressure and delivers the oxygen to a delivery or distribution line, with which the welding torches are connected. The average delivery pressure can be controlled by adjusting the regulator, but momentary fluctuations in the delivery pressure occur and cause unsatisfactory operation of the torches.

These fluctuations are often caused by the cooling of the gas when it expands from the high cylinder pressure in the regulator. Some moisture is contained in the oxygen, and when it expands and cools some of the moisture condenses. The valve opening in a regulator reducing from high pressure is extremely small and is materially obstructed by a particle of moisture. Such an obstruction causes a drop in the delivery pressure of the regulator, and this pressure drop causes the valve to open wider until the particle of moisture passes through. Upon removal of the obstruction, the oxygen rushes through the wider valve opening and causes a sudden rise in the delivery pressure before the regulator valve returns to its proper position. These fluctuations are particularly troublesome in cold weather, and interfere with the proper operation of the welding torches.

Fluctuations in regulator delivery pressure occur from other causes and with other gases or vapors. In the case of highly volatile liquids which are stored in cylinders under pressure and drawn off as vapor by reducing the pressure in the cylinder, the vapor entering the pressure regulator is near the saturation point, so that comparatively little cooling on expansion in the regulator causes condensation and fluctuation in the delivery pressure of the regulator.

An object of this invention is to provide apparatus for connection in series with a pressure regulator to prevent rapid changes in the pressure at which gas is supplied to a delivery line, so that the momentary fluctuations of the regulator delivery pressure are eliminated and the gas delivered at a substantially uniform average pressure.

When gas is delivered from a gas generator, compressor or pump, objectionable fluctuations in pressure often occur. The delivery pressure of acetylene generators is affected by the introduction of fresh carbide into the water. Such fluctuations are less severe and of much longer duration than the fluctuations in a regulator delivery, already described, but it is sometimes desirable to deliver the acetylene at a substantially uniform average pressure.

Another object of the invention is to provide apparatus which can be connected in series with a gas generator, pump, or other source of gas supply, to prevent fluctuations in the pressure at which the gas is supplied to a delivery line, the apparatus having means to automatically regulate it for any continued rise or fall in the pressure of the gas supply, so that it acts to stabilize the pressure at the increased or decreased average value.

Another object is to provide a gas pressure stabilizer consisting of a pressure regulating valve mechanism and a counterbalancing chamber into which gas can flow through a bleed connection, so that a continued increase in the pressure at which gas is supplied to the stabilizer will cause the pressure to increase in the counterbalancing chamber and the delivery pressure of the stabilizer to correspondingly increase. Another object is to construct the counterbalancing chamber and bleed conduit so that the stabilizer will automatically regulate itself to a continued decrease in pressure, as well as a continued increase.

Other objects and advantages of the invention will appear or be pointed out as the specification proceeds.

In the accompanying drawings, forming a part hereof:

Fig. 6 is a fragmentary sectional view of a modified form of the invention.

Fig. 1 shows a welding torch T connected with fuel and oxygen cylinders. Each cylinder is equipped with a pressure regulator R, and a stabilizer S, made in accordance with this invention, is connected in series with the oxygen regulator.

Figure 3:
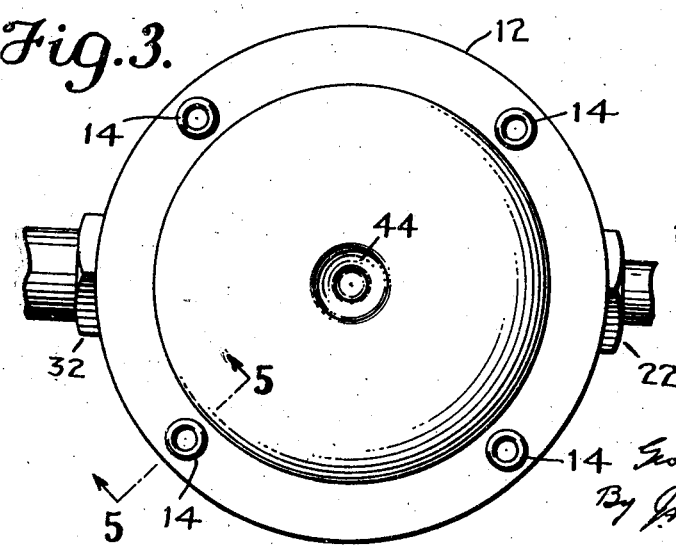
Fig. 3 is a top plan view of the stabilizer shown in Fig. 2.
Figure 5:
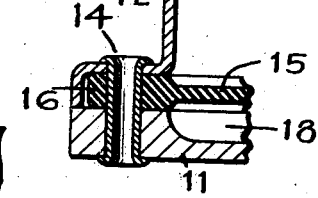
Fig. 5 is a section on the line 5—5 of Fig. 3.

The stabilizer comprises a housing having a body member 11 and a casing member 12, which are secured together by fastening members, such as rivets 14 (Fig. 3). A diaphragm 15, of soft rubber or other suitable material, is clamped between the body and casing members 11 and 12. I prefer to use a molded diaphragm having a thick resilient rim 16 against which the members clamp. Such a diaphragm is not distorted by the clamping pressure and allows greater manufacturing tolerances in fastening the casing to the body.

The diaphragm 15 divides the interior of the housing into a lower chamber 18 and an upper or counterbalancing chamber 20.

An inlet fitting 22 is threaded into the body member and communicates with a conduit 24, which has a discharge port 25 opening into the lower chamber 18. A valve 26 controls the flow of gas through the discharge port 25, and a spring 28 urges the valve into closed position. The valve is shown in closed position in the drawings. A plug 30 threads into the lower end of the body member and can be removed for access to, or removal of, the spring 28 and valve 26.

A delivery fitting 32 is threaded into the body member, and gas from the lower chamber 18 flows out of the housing through this delivery fitting 32.

The diaphragm 15 is clamped between upper and lower diaphragm plates 34 and 35, respectively, by a screw 36, which threads into a diffuser block 38, the construction of which will be described later.

The valve 26 has a stem 40, which contacts with the screw 36. This stem 40 is an operative connection between the valve and diaphragm, and causes the valve to move with the diaphragm. When the diaphragm flexes downwardly, the stem 40 is forced downwardly and the valve 26 opens against the pressure of the spring 28. When the diaphragm flexes upwardly, the spring 28 closes the valve and holds the stem 40 against the screw 36. It should be understood that closing of the valve 26 by the spring 28 will not usually be a total closing which entirely stops the flow of gas. The operation of the diaphragm and spring 28 may cause the valve to close half-way, three-quarters, or totally, depending on the extent of the pressure increase and the rate of gas flow to the torch.

A compression spring 42 contacts at one end with the casing member 12, and the spring is held against lateral displacement by a boss 44. The lower end of the spring 42 fits over a boss 45 on the top of the diffuser block 38. The spring 28 is stronger than the spring 42, so that some pressure in the discharge port 25 is necessary to open the valve 26. The structure thus far described, aside from the bleed conduit and diffuser block, is a pressure regulating valve mechanism and operates as such with momentary pressure fluctuations, as will be more fully described in reviewing the complete operation of the stabilizer.

The diffuser block includes a body 48, a diffuser 50, and soft rubber gaskets 52 above and below the diffuser. The screw 36 threads into the body 48 and holds the diffuser block secured to the diaphragm. The diffuser is made of material which is sufficiently permeable to allow minute quantities of gas to flow from a bleed conduit 54 into the counterbalancing chamber 20, or vice-versa.

The degree of permeability of the diffuser depends on the volume of the counterbalancing chamber and the length of the fluctuations in pressure which the stabilizer is designed to eliminate. If the volume of the counterbalancing pressure chamber is made larger, the rate of flow of gas through the diffuser can be increased because more gas will be required to build up the pressure in the chamber. If the flow through the diffuser is made smaller, the stabilizer will be effective to eliminate fluctuations of longer duration, but it will also take longer for the stabilizer to automatically regulate itself to an increased or decreased average pressure.

I prefer to make the stabilizer a small unit, which may be attached to gas cylinders, and since the volume of the chambers is quite limited a diffuser of very low permeability is a characteristic of such a stabilizer. I have found an alundum diffuser very satisfactory when made in a size which passes about one-tenth as much gas as an orifice cut by a No. 80 drill. Unglazed porcelain is another suitable material.

Figure 1:
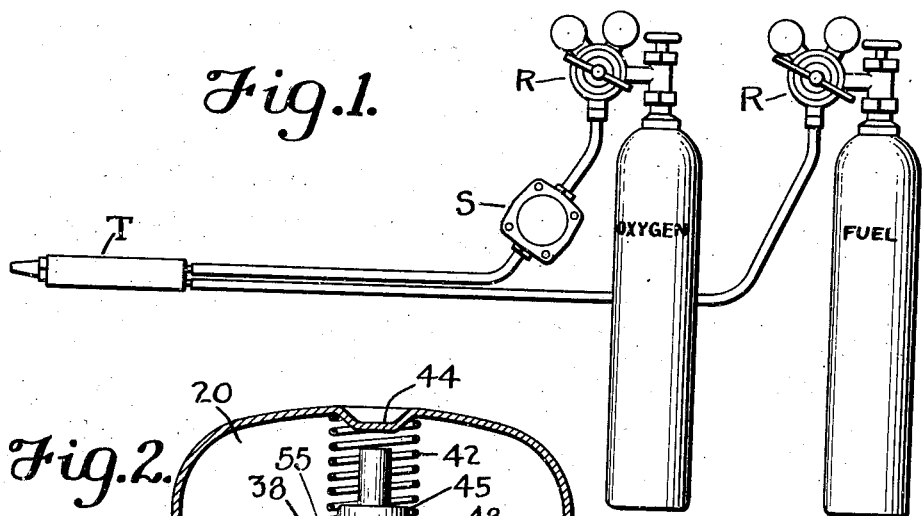
Fig. 1 is a diagrammatic view of an oxy-fuel welding torch and connections, showing the pressure stabilizer of this invention connected in series with the oxygen regulator.
Figure 2:
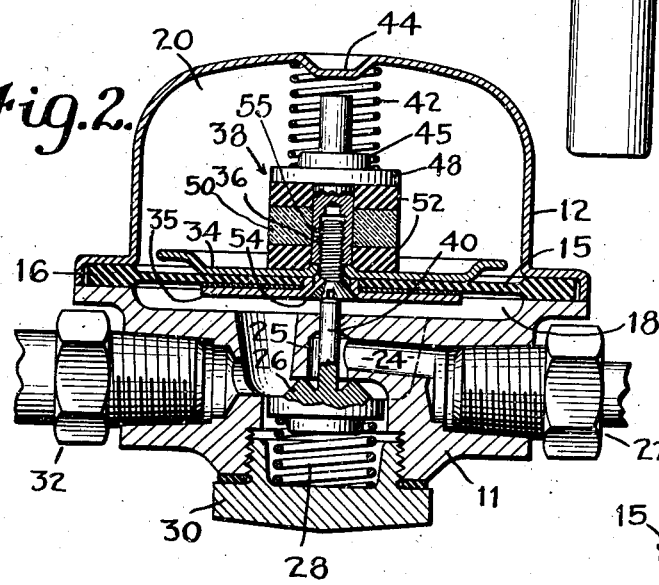
Fig. 2 is an enlarged sectional view of a gas pressure stabilizer made in accordance with this invention.

The bleed conduit 54 comprises a slot along the head of the screw 36, the clearance along the threads of the screw, and an opening 55 through the threaded part of the body 48, as shown in Fig. 2. The clearance along the screw threads provides sufficient conduit for the minute quantity of gas flowing.

Figure 4:
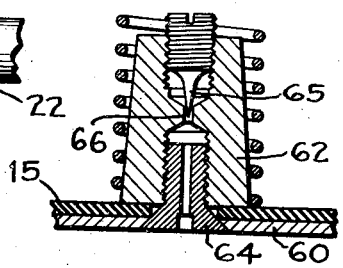
Fig. 4 illustrates a modified form of bleed conduit for the stabilizer shown in Fig. 2.

Fig. 4 shows a modified form of the invention in which a needle valve is used instead of a diffuser for retarding the flow of gas through the bleed conduit. In this form of the invention the diaphragm 15 is clamped between a diaphragm plate 60 and a block 62 by a screw 64 which threads into the block. A needle valve 65 is threaded into the upper end of the block 62, and this needle valve controls the flow of gas through a port 66 in the block. The screw 64 has a conduit, along its axis, through which gas flows to the needle valve. After passing the point of the needle valve, gas flows along the threads of the needle valve and into the chamber 20. Even though the needle valve threads tightly into the block 62, there is sufficient clearance along the threads for the minute quantity of gas which flows past the point of the needle valve.

The needle valve may be adjusted to control the rate of flow of gas from one side of the diaphragm to the other. By making the rate of flow very small, the stabilizer can be made to eliminate fluctuations of longer duration, but more time will be required for the stabilizer to regulate itself to the proper pressure when the gas is initially turned on or when a new pressure is used in the supply line.

When designing the stabilizer for a gas which will clog a diffuser or needle valve, an open bleed conduit is used. Acetylene contains a certain amount of lime dust, even after filtering, and would clog a diffuser or needle valve very quickly. The bleed conduit for such a gas is large enough to avoid clogging and the volume of the counterbalancing pressure chamber is large enough to compensate for the increased flow.

Fig. 6 shows a stabilizer suitable for use with an acetylene generator. The bleed conduit 70 is sufficiently large to avoid clogging with lime dust. The counterbalancing pressure chamber is a tank 72, which provides sufficient volume so that the stabilizer will eliminate pressure fluctuations of long duration. A by-pass conduit 74 has a valve 75, which may be opened to equalize the pressure on both sides of the diaphragm when the gas to the stabilizer is initially turned on. The other details of the stabilizer shown in Fig. 6 are the same as Fig. 2, except that the device is turned upside-down in connecting it to the tank 72.

The operation of the stabilizer shown in Fig. 2 is as follows:

Gas from a pressure regulator or other source enters the stabilizer through the inlet fitting 22, and pressure in the conduit 24 increases until it is sufficient to open the valve 26 against the unbalanced pressure of the spring 28. Comparatively little pressure is required to open the valve because most of the pressure of the spring 28 is balanced by the spring 42.

When the valve 26 is open, gas from the conduit 24 flows through the discharge port 25 and into the chamber 18. The pressure in the lower chamber 18 causes gas to leak through the bleed conduit and diffuser until the pressure in the counterbalancing chamber 20 is equal to the pressure in the lower chamber 18.

As long as the pressure in the chamber 18 remains constant, and the pressure in conduit 24 remains sufficiently greater to hold the valve 26 open, gas will flow through the stabilizer.

If the delivery pressure of the regulator suddenly increases, the pressure in the conduit 24 increases, but as soon as pressure begins to rise in the chamber 18 the diaphragm is moved upwardly and the spring 28 closes the valve 26 so that the increase in pressure does not affect the flow of gas beyond the stabilizer.

The increased pressure under the diaphragm starts a flow of gas through the bleed conduit 54 and diffuser 50. The gas flow through the diffuser is very slow, however, and if the increased pressure is a momentary fluctuation, the delivery pressure of the regulator drops and the flow of gas through the delivery fitting 32 causes the pressure in the lower chamber to drop, so that the stabilizer again operates in its original manner before enough gas has passed through the diffuser to appreciably change the pressure in the counterbalancing chamber 20.

If the delivery pressure of the regulator suddenly drops, the pressure in the conduit 24 also drops and the valve 26 begins to close. As soon as the pressure in the chamber 18 begins to fall below that in the counterbalancing chamber, however, the excess pressure above the diaphragm causes the diaphragm to flex downwardly and open the valve 26 so that more gas flows through the discharge port 25. There is a normal pressure drop through the stabilizer, depending on how much pressure is required to open the valve 26 when pressures on opposite sides of the diaphragm are equal. When the pressure above the diaphragm is greater than that below, this downward pressure will help to open the valve 26, and the pressure drop through the regulator will be less.

Thus the stabilizer prevents momentary drops in the delivery pressure of the regulator from affecting the pressure beyond the stabilizer. If the pressure drop is of momentary duration, no appreciable amount of gas flows through the diffuser before the regulator delivery pressure again rises.

If it is desirable to adjust the pressure regulator for a different delivery pressure, the stabilizer will automatically regulate itself to operate at the new pressure and prevent momentary fluctuations in the new pressure from affecting the gas flow beyond the stabilizer. The means which automatically regulate the stabilizer to operate for a different pressure include the bleed conduit 54 and diffuser 50. An increase in pressure, if sufficiently prolonged, will cause gas to flow from the lower chamber 18, through the bleed conduit and diffuser, to the counterbalancing pressure chamber 20, and the pressure on the two sides of the diaphragm will balance with a higher pressure in the chamber 18. The stabilizer is thus automatically regulated to stabilize a higher average pressure, and it is therefore necessary to make only the one adjustment at the pressure regulator in order to change the pressure at which gas is supplied to the torch.

The invention has been illustrated in its preferred embodiments, but it will be understood that terms of orientation are purely relative, and that positions of parts can be reversed, and other changes and modifications made without departing from the invention as set forth in the following claims.

I claim:

1. A gas pressure stabilizer, comprising a pressure regulating valve having a pressure chamber; a counterbalancing chamber for controlling the delivery pressure of the regulating valve; and a bleed conduit through which gas in the pressure chamber can enter the counterbalancing chamber at a slow rate so that a substantial time lag exists between changes in the pressure in the pressure chamber and a corresponding change of pressure in the counterbalancing chamber.

2. A gas pressure stabilizer, comprising a pressure regulating valve having a pressure chamber; a counterbalancing chamber for controlling the delivery pressure of the regulating valve; a bleed conduit through which gas in the pressure chamber can enter the counterbalancing chamber; and means for regulating the rate of flow through the bleed conduit to control the time required for the pressure in the counterbalancing chamber to change in accordance with the pressure change in the pressure chamber.

3. A gas pressure stabilizer comprising a pressure regulating valve having a diaphragm exposed on one side to gas pressure in a chamber of the regulating valve; a counterbalancing chamber on the other side of the diaphragm; a conduit through which gas flows between the chambers, said conduit being restricted to retard the gas flow.

4. A gas pressure stabilizer comprising a pressure regulating valve having a diaphragm exposed on one side to gas pressure in a chamber of the regulating valve; a counterbalancing chamber on the other side of the diaphragm, the diaphragm having an opening therethrough for the flow of gas between the chambers; and means for retarding the flow of gas through the opening so that there is a substantial time lag between a pressure change in the regulating valve chamber and a corresponding pressure change in the counterbalancing chamber.

5. A gas pressure stabilizer comprising a housing; a valve for controlling the flow of gas through the housing; means for closing the valve when the gas pressure in the housing reaches a predetermined maximum; and means, responsive to a continued change in gas pressure, for causing the valve closing means to operate at a different predetermined pressure.

6. A gas pressure stabilizer comprising a housing enclosing a chamber; a valve in the housing for controlling the flow of gas into the chamber; a diaphragm in the housing exposed on one side to the gas pressure in the chamber; operative connections between the diaphragm and the valve for causing the valve to close when the pressure in the chamber reaches a predetermined maximum; means responsive to a change in gas pressure for causing the valve closing means to operate at a different predetermined maximum pressure; and means for delaying the operation of the pressure responsive means.

7. A gas pressure stabilizer comprising a housing enclosing a chamber; a valve in the housing for controlling the flow of gas into the chamber; a diaphragm in the housing exposed on one side to the gas pressure in the chamber; a spring on the other side of the diaphragm urging the valve open; means for causing the valve to close when the pressure in the chamber reaches a predetermined value; a counterbalancing pressure chamber on the other side of the diaphragm; and a restricted conduit through which gas flows between the counterbalancing pressure chamber and the other chamber.

8. A gas pressure stabilizer comprising a housing; a diaphragm dividing the housing into two chambers; a valve to control the flow of gas through the housing; means operated by movement of the diaphragm to control the position of the valve so that as the pressure on one side of the diaphragm increases the valve moves toward closed position; and a bleed conduit between the chambers for equalizing the pressure in the chambers to counterbalance the increase in pressure on one side of the diaphragm.

9. In gas supply apparatus of the type having a pressure regulator for reducing the pressure of the gas supplied from a source of gas, a pressure stabilizer connected in series with the pressure regulator, and including valve means for retarding the flow of gas when it reaches a predetermined pressure, and means responsive to a continued change in pressure for causing the valve means to operate to retard the flow at a different pressure.

10. A gas pressure stabilizer including a housing; a diaphragm dividing the housing into upper and lower pressure chambers; a valve for controlling the flow of gas through the housing; operative connections between the valve and the diaphragm for closing the valve as the effective pressure under the diaphragm increases; and a restricted conduit through which gas in the lower chamber flows into the upper chamber to increase the pressure above the diaphragm so that the effective pressure against the lower side of the diaphragm becomes less.

11. A gas pressure stabilizer including a housing; a diaphragm dividing the housing into upper and lower pressure chambers; a valve for controlling the flow of gas into the lower chamber, the valve opening in the direction of the gas flow into the lower chamber; a spring urging the valve into closed position; and operative connections between the valve and diaphragm for causing the valve to close as the effective pressure in the lower chamber increases; a conduit through the diaphragm for the passage of gas between the upper and lower chambers; and means for retarding the flow of gas through the conduit.

12. A gas pressure stabilizer including a housing; a diaphragm dividing the housing into upper and lower pressure chambers; a valve for controlling the flow of gas through the housing; a lower spring urging the valve into closed position; an upper spring urging the diaphragm downwardly; an operative connection for transmitting the downward force of the diaphragm against the valve in opposition to the lower spring, so that the effective gas pressure under the diaphragm will oppose the force of the upper spring and thus increase the effective force of the lower spring; a conduit through the diaphragm for the flow of gas between the upper and lower chambers so that the pressures in these chambers will equalize; and means for retarding the flow of gas through the conduit.

13. A gas pressure stabilizer including a housing comprising two parts; a molded rubber diaphragm having a thick resilient rim clamped between the two parts of the housing and dividing the housing into two chambers; fastening means holding the housing assembled; valve means controlled by movement of the diaphragm for regulating the flow of gas through the housing; a conduit connecting the two chambers so that pressure in the chambers will equalize; and means for retarding the flow of gas through the conduit.

14. In combination with a gas supply line; a stabilizer including valve means for controlling the flow of gas through the supply line; valve operating means for moving the valve to prevent substantial changes, of less than a given duration, in the pressure at which gas is delivered from the stabilizer; and means responsive to a continued change in the supply line pressure for automatically compensating the valve operating means to stabilize the gas pressure at a different value.

15. In welding apparatus of the type having a source of gas at high pressure, a torch, and a regulator for receiving gas at high pressure from said source and delivering it at reduced pressure, a pressure stabilizer for receiving gas from the regulator and delivering it to the torch, the stabilizer including means for eliminating momentary fluctuations in the pressure of the gas flowing through the stabilizer, and means for automatically compensating the stabilizer for permanent changes in the delivery pressure of the regulator.

16. A gas pressure stabilizer, comprising a pressure regulating valve having a pressure chamber; a counterbalancing chamber for controlling the delivery pressure of the regulating valve; a bleed conduit through which gas in the pressure chamber can enter the counterbalancing chamber at a slow rate so that a substantial time lag exists between changes in the pressure in the pressure chamber and a corresponding change of pressure in the counterbalancing chamber; and a valve controlled by-pass around the bleed conduit.

17. In gas supply apparatus of the type having a source of gas at high pressure, conduit means for supplying the gas to a torch, and a pressure regulator, in series with said conduit means, for receiving gas at high pressure from said source and delivering it at reduced pressure, a pressure stabilizer in series with the pressure regulator on the delivery side of said regulator, said stabilizer including means for preventing a sudden rise in the delivery pressure of the regulator from reaching the torch, and means responsive to a continued rise in pressure for permitting the increased pressure to reach the torch.

GEORGE M. DEMING.